L. POTTER.
WHEEL.
APPLICATION FILED APR. 29, 1916.
1,232,081.
Patented July 3, 1917.
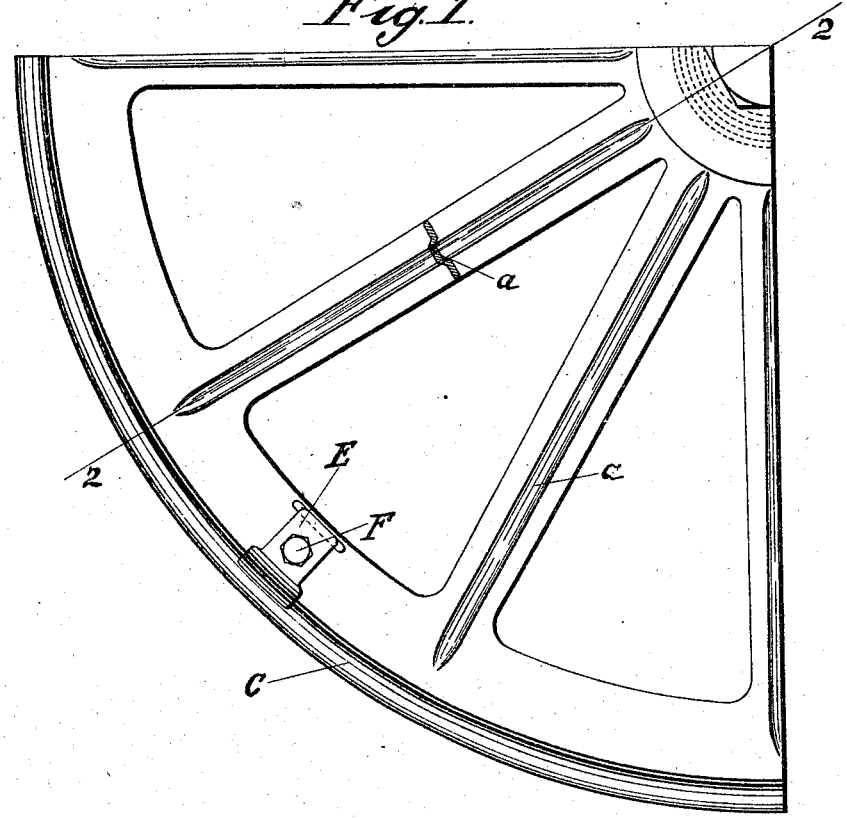
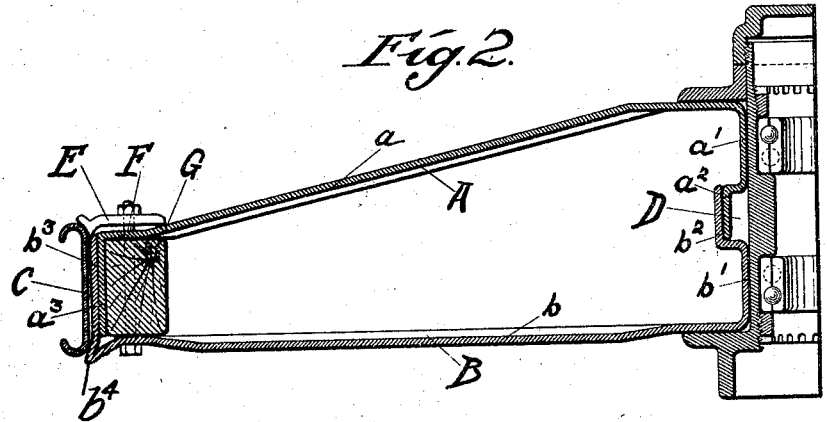
Inventor
Lincoln Potter.
By Attorneys
Southgate & Southgate.

UNITED STATES PATENT OFFICE.

LINCOLN POTTER, OF WORCESTER, MASSACHUSETTS.

WHEEL.

1,232,081.  Specification of Letters Patent.  Patented July 3, 1917.

Application filed April 29, 1916. Serial No. 94,464.

*To all whom it may concern:*

Be it known that I, LINCOLN POTTER, a citizen of the United States, residing at Worcester, in the county of Worcester and State of Massachusetts, have invented a new and useful Wheel, of which the following is a specification.

This invention relates to a wheel formed of pressed metal and although capable of general use, yet especially adapted for use on automobiles and trucks.

The principal objects of the invention are to provide a light, strong construction which will be cheap and easy to manufacture, which will have a small number of parts, being only two principal parts in number; which shall be easy to lubricate because there will be no necessity for removing the cap or wheel; which can be formed by dies without machine work, and which will do away with the breakage of the wire spokes in that type of wheel; which will not be subject to the loosening of spokes or the shrinkage thereof as in wooden wheels; which will have no threads to wear out, no springs, and yet will be as strong and resilient as a wooden wheel; which will be easy and convenient to make on account of being smooth and free from bolts, rivets, etc., and which will have all parts readily accessible; also to provide a wheel which will be so constructed that the addition of the outer rims and hub flanges will strengthen it and prevent possible loosening of the parts of the wheel, and which will have the rim and hub integral with each other, thus requiring no sleeves or fastening devices to keep the parts of the wheel together. Further objects and advantages of the invention will appear hereinafter.

Reference is to be had to the accompanying drawings in which—

Figure 1 is a side elevation of a portion of a wheel constructed in accordance with this invention, and Fig. 2 is a sectional view on the line 2—2 of Fig. 1 longitudinally through one of the spokes.

The wheel itself consists of two members of pressed metal A and B. Each of these members is adapted to be pressed out by ordinary metal pressing processes without serious complications, and without thinning the metal at any point so as to weaken it. Each one of these parts is of circular form and is provided with a central hub portion, a felly portion, and a web portion comprising spokes. The central portion has a rigid hollow cylindrical part for the reception of the hub, and the felly portion has a cylindrical part for the reception of the removable rim C.

The spokes are of course pressed out with the rest of the two blanks, and it is preferred to have the spokes of the two parts A and B directly opposite each other so as to register. These spokes are preferably provided with longitudinal or radial strengthening ribs $a$, $b$ which are formed by pressing the metal outwardly.

At the center each of these members is pressed inwardly to form two concentric hub flanges $a'$ and $b'$ of the same diameter. These two come substantially together at the center so as to complete the hub and connect the two members at that point. The way shown for connecting them is to offset them outwardly so as to form two cylindrical flanges $a^2$ and $b^2$, one fitting inside the other. These flanges are then secured together preferably by electrical welding so that the two members A and B are firmly united at the center. This also leaves a circular oil groove D which will receive oil in the usual way and provide the desired lubrication for the bearing balls with which the hubs will ordinarily be provided. No description is given here of the particular hub shown as that does not constitute a part of this invention.

At the circumference a similar construction is provided, the two members A and B having cylindrical flanges, $a^3$ and $b^3$, one fitting in the other throughout their length and preferably electrically welded together. One of these flanges, in the form shown the one marked $b^3$, is provided with an outward circumferential bend $b^4$ designed to form one end of the seat for the metallic rim C. This is secured on the other side of the wheel by a series of clamp plates E each projecting in between the rim C and the flange $b^3$. These clamp plates are held in position by bolts F. It will be noticed that while these bolts are employed they are not used to hold the wheel itself together but only to clamp the rim in place. For the purpose of making this construction more rigid at this point and especially to prevent the tightening up of these bolts without any distorting effect on the wheel an inner felly G is provided formed of a ring of wood. This fits between the edges of the felly portions of the members A and B and prevents their being forced toward each other when the nuts are tightened upon the bolts.

In this way an extremely strong and rigid construction is secured with a minimum amount of metal and with the metal in its simplest form, and the other advantages above mentioned are also secured as will be obvious. By having each spoke straight and separated widely, they are rendered extremely strong and light.

Although I have illustrated and described only a single embodiment of the invention I am aware of the fact that modifications can be made therein by any person skilled in the art without departing from the scope of the invention as expressed in the claims. Therefore I do not wish to be limited to all the details of construction herein shown and described, but what I do claim is:—

1. As an article of manufacture, a complete wheel frame consisting of two parts, each of said parts consisting of a single pressed metal member having a cylindrical hub flange, a plurality of spokes, and a cylindrical felly flange all integrally connected with each other, the two felly flanges fitting one within the other and secured together and the two hub flanges fitting one within the other and secured to the inner surface of the other.

2. As an article of manufacture, a complete wheel frame consisting of two parts, each of said parts consisting of a single pressed metal member having a hub portion, a felly portion, and a web portion, all integrally connected with each other, the two felly portions having cylindrical flanges, one outside the other and secured to the outer surface of the other, and the outside one having a circumferential side projection continuous with the felly portion on that side and inclosing the edge of the opposite felly flange for receiving the edge of a removable rim.

3. As an article of manufacture a complete wheel frame consisting of two parts, each of said parts consisting of a single pressed metal member having a hub portion, a plurality of spokes, and a felly portion, all integrally connected with each other, one of said two parts being substantially flat from the end of the felly portion to the end of the hub portion, and the other being substantially conical, all the spokes being substantially straight throughout their lengths and entirely out of contact with the spokes on the opposite side of the wheel.

4. As an article of manufacture, a wheel consisting of two parts, each of said parts having a hub portion, a felly portion, and a web portion, said hub portions being of the same diameter at their ends, each being pressed outwardly and then overlapping and secured together on a circle having a larger diameter so as to form an oil groove at the center of the hub portion.

5. As an article of manufacture, a wheel consisting of two parts, each of said parts having a hub portion, a felly portion, and a plurality of spoke members, all integrally connected with each other, the two felly portions having cylindrical flanges, one outside the other and welded to the outer surface thereof, the outside one having a circumferential side projection for receiving the edge of a removable rim, a series of clamps on the other side of the wheel for holding said rim, and a wooden ring inside the felly against which said clamps are secured.

6. As an article of manufacture, a wheel consisting of two parts, each of said parts comprising a single pressed metal member, one having a circumferential side projection for receiving the edge of a removable rim, a series of clamps on the other side of the wheel for holding said rim, and a wooden ring inside the felly against which said clamps are secured.

In testimony whereof I have hereunto set my hand.

LINCOLN POTTER.

Witness:
PAUL POTTER.